United States Patent

[11] 3,618,537

| [72] | Inventors | John C. Bogue<br>101 Ocean Ave., Santa Monica, Calif. 90402;<br>Robert I. Sarbacher, 1036 S. 1st St., Arcadia, Calif. 91006 |
|---|---|---|
| [21] | Appl. No. | 884,990 |
| [22] | Filed | Dec. 15, 1969 |
| [45] | Patented | Nov. 9, 1971 |

[54] SOLID WASTE DISPOSAL SYSTEM
12 Claims, 1 Drawing Fig.

[52] U.S. Cl. .................................................. 110/8 R, 110/10, 110/18 R
[51] Int. Cl. .................................................. F23g 5/02
[50] Field of Search ............................................ 110/7, 8, 14, 15, 10, 18

[56] References Cited
UNITED STATES PATENTS

| 2,213,667 | 9/1940 | Dundas et al. .................. | 110/14 |
| 2,238,161 | 4/1941 | Drew et al. .................... | 110/14 |
| 2,269,273 | 1/1942 | Krogh et al. ................... | 110/15 |
| 3,306,237 | 2/1967 | Ransom, Jr. .................... | 110/14 |
| 3,521,581 | 7/1970 | Quesnel ........................ | 110/8 |

Primary Examiner—Kenneth W. Sprague
Attorney—Witherspoon and Lane

ABSTRACT: A high-temperature furnace is disclosed which is equipped with several stages in which a rotating magnetic field rotates the magnetic components of the waste material to be incinerated. Gas jets protect the combustion chambers from excessive heat and assist in the tumbling of nonmagnetic materials in the combustion chambers. Each combustion chamber is further equipped with a liquid jacket for additional cooling. The fuel injected into the combustion chambers consists in part of finely divided oxidizable metal dispersed in a liquid. Control of all components of this waste disposal system rests in a computer which monitors the overall operation of the system and adjusts the controls for optimum operating efficiency.

PATENTED NOV 9 1971 3,618,537
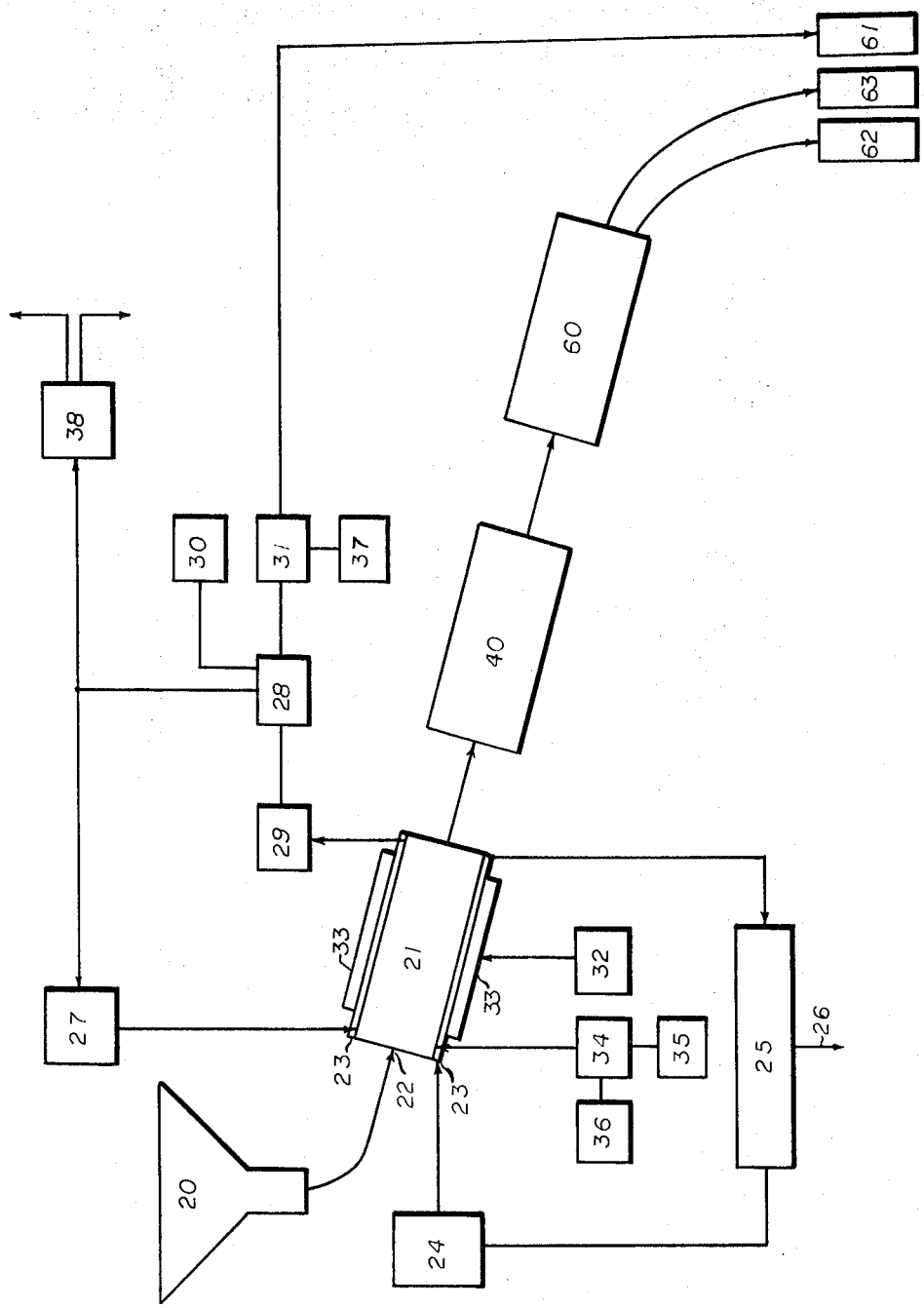
INVENTORS
JOHN C. BOGUE
ROBERT I. SARBACHER

SOLID WASTE DISPOSAL SYSTEM

BACKGROUND OF THE INVENTION

Because of the urgent and increasing need for the efficient disposal of waste products, especially in densely populated areas, a number of significant improvements in waste disposal have been forthcoming in recent years. None of these however, take full cognizance of the most recent technological advances as for example, in the development of high temperature resistant materials for space technology. Further, the work done in the development of magnetic containers for confining high-temperature ionized gases such as produced in controlled fusion experiments contain many features applicable to solid waste disposal.

SUMMARY OF THE INVENTION

The present invention relates expressly to the employment of the most advanced technology to effectively provide a waste disposal system of high efficiency. By employing both gas and liquid cooling, for example, the need for furnace refractories is eliminated. By employing both high-velocity gases and rotating magnetic fields the need to employ heavy rotating compartments with subsequent maintenance is eliminated. By employing confining magnetic fields the ionized gases developed through high-temperature combustion may be controlled, cooled and released into the atmosphere with a minimum of contamination. By employing finely divided mixtures of oxidizable metal dispersed in a liquid carrier as a fuel, temperatures can be attained which vaporize rock, clay, concrete and other ceramic materials.

It is accordingly, the object of the present invention to provide a waste disposal unit which is operated in stages wherein the temperature of the combustible material or reactants is gradually increased to the point that the end products are ash, molten metal and ionized gases.

It is a further object of the present invention to provide rotation and tumbling of the reactants by a combination of a rotating magnetic field and directed gas jets.

It is a further object of the present invention to provide confinement of the incinerated ion gas products by magnetic fields.

It is a further object of this invention to provide a waste disposal unit that is readily controlled by any suitable control means such as a computer to provide optimum performance.

Other objects and advantages of the present invention will become apparent to those skilled in the art from a consideration of the detailed description of one specific embodiment of the invention, had in conjunction with the accompanying drawing.

BRIEF DESCRIPTION OF THE DRAWING

The FIGURE shows a schematically represented diagram of one embodiment of the invention.

DETAILED DESCRIPTION OF INVENTION

For the purposes of illustration, the components of the system are only schematically represented because the various structures therefore are well known in the art, and the details thereof are not material to the present invention.

The figure shows the various components of the system and their relation to each other. The system employs a gravity feed. The waste material is dumped directly into the hopper 20 and is fed therefrom into combustion chamber 21. This chamber is cylindrical in form and the refuse from the hopper 20 is fed into one end of the cylindrical combustion chamber as indicated by the arrow 22. The interior wall of the combustion chamber 21 is made of high-temperature nonmagnetic material; the outer wall, also of nonmagnetic material, is fabricated in such a way as to form a liquid cooling jacket 23. The liquid pump 24 continuously circulates the cooling liquid through this jacket and into the heat exchanger in a standard manner well known in the art. Heat from the heat exchanger 25 may be fed to auxiliary equipment as indicated by the arrow 26 to be used for any gainful purpose, or may be dissipated into the air.

A gas compressor 27 feeds gas at high pressure into nozzles which are arranged around the periphery of the cylinder and enter the interior tangentially to the interior circumference. Some of this gas is extracted from the combustion chamber 21 and forced into the filter 28 through vents in the combustion chamber at the end opposite the end at which the reactants enter, by the pump 29. The remaining gas may be sucked into combustion chambers 40 and 60 and exhausted through similar vents located in a corresponding position in each of these chambers.

The pressure gradient existing in the system is adjusted so that there is a pressure differential just sufficient to cause the waste material to be sucked into the chamber 21 and at the proper time into chamber 40 and thus to chamber 60 where the remainder is disposed of as described later.

The electrostatic filter 28 is equipped with a high-voltage supply 30 which collects any ionized particles and material in the gas and removes them by means of the cleaner 31 using techniques well known in the art.

The rotating magnetic field is supplied by the generator 32 to the field coils 33 so as to set up the field in such a manner that it will cause the rotation of any magnetic material in the reactants being incinerated to be in the same direction as the jets of rotating gas move it.

The fuel is injected into the combustion chamber thru liquid-cooled nozzles in such a manner as to start the combustion of the waste material immediately upon entering the combustion chamber 21. This fuel consists of finely divided mixtures of oxidizable metal dispersed in a liquid which is supplied to the fuel pump 34 by the agitator container 35.

The fuel consists of a mixture of metal powder and water which is noncombustible at ordinary temperatures and will not deteriorate. When the fuel burns, the metal reacts with the water to produce hydrogen. At the same time the metal reacts with water and oxygen to produce its oxide. The ratio of weight of water to weight of metal should be about 1.5 to 1. Iron or aluminum may be used as may zinc, magnesium or cadmium. Reactive metal salts may be added to improve the combustion where these salts may decompose to yield oxygen, as for example, ammonium perchlorate.

During combustion, the fuel is supplied with oxygen from the oxygen generator 36. Such generators are well known in the art and may for example be of the electrolysis type. The ignition temperature which is sustained by the temperature of the burning waste may be started by acetylene.

Each of the combustion chambers 40 and 60 are similarly equipped as the chamber 21 described above. This auxiliary equipment, in the interest of brevity, is not shown. However, as the temperature of combustion is gradually raised as the waste travels successively from chamber 21 to chamber 40 to chamber 60, the waste material is vaporized to high-temperature ionized gases which are circulated thru the filters 28 and cleaned of any material contamination electrostatically. This contamination removed by superheated steam is deposited in the receptacle 61 for removal and analysis of valuable ingredients. Some of the heat extracted from the heat exchanger 25 may be used to supply the steam generator 37.

When the gas pressure reaches a proper value it is released into the condenser 38 where it may be cooled and exhausted into the air or processed for recovery of value.

Molten metals from the combustion chamber 60 may be collected to form pigs in a sand mold 62 and shipped to refineries for processing and recovery. The remaining ash 63 may be compressed to form useful construction materials or for other purposes.

While no specific control means for operating the incinerator is illustrated, it should be obvious that any suitable manual or automatic control means could be utilized to control and adjust all pressures, temperatures and auxiliary equipment. If automatic control is used, a computer would be ideally suited for such control since the computer would provide rapid and positive control of all variables and therefore provide optimum performance.

While the invention has been described with reference to a specific embodiment thereof, it will be apparent to those skilled in the art that various changes and modifications could be made to the specific embodiment disclosed without departing from the spirit and scope of the invention as set forth in the claims.

What is claimed is:

1. A solid waste disposal system comprising:
   a plurality of combustion chambers each having an axis, said combustion chambers being axially aligned along a line tilted to the horizontal;
   means to introduce solid waste into the first of said plurality of combustion chambers, said solid waste travelling from the first of said plurality combustion chambers to the next said chamber in line under the influence of gravity after a predetermined period of time and then travelling to the next of said chambers in line under the influence of gravity after a second predetermined period of time and so forth until said solid waste is housed in the last of said plurality of chambers;
   means associated with each of said combustion chambers for providing a rotating magnetic field to rotate the magnetic components in said solid waste;
   means to provide combustion in each of said chambers; and
   means to discharge combusted waste products from the last of said plurality of combustion chambers.

2. A solid waste disposal system as defined in claim 1 wherein said means to provide combustion includes a gas introduced into each of said plurality of combustion chambers by means of high-velocity gas jets.

3. A solid waste disposal system as defined in claim 2 wherein said high-velocity gas jets introduce said gas into each chamber in such a direction as to rotate the nonmagnetic components of said solid waste in the same direction as said rotation of said magnetic components.

4. A solid waste disposal system as defined in claim 2 wherein said means to provide said combustion also includes a special fuel along with means to provide some of the oxygen required for combustion.

5. A solid waste disposal system as defined in claim 4 wherein said special fuel comprises metal powder dispersed in water and said means to provide some of the required oxygen is a reactive metal salt.

6. A solid waste disposal system as defined in claim 5 wherein said powdered metal is one selected from the group consisting of iron, aluminum, zinc, magnesium and cadmium.

7. A solid waste disposal system as defined in claim 4 wherein means are provided with each of said plurality of combustion chambers to extract gases created by combustion and evaporation and said extracted gases are filtered to remove material carried by said gases.

8. A solid waste disposal system as defined in claim 4 wherein cooling means are provided to maintain the structural strength of the components of said disposal system subjected to very high temperatures.

9. A solid waste disposal system as defined in claim 8 wherein said means to provide said rotating magnetic field comprises separate coils surrounding each of said plurality of combustion chambers.

10. A solid waste disposal system as defined in claim 4 wherein oxygen is supplied to each of said combustion chambers.

11. A method for solid waste disposal comprising the steps of:
    1. introducing solid waste into a combustion chamber;
    2. rotating magnetic components of said solid waste in said combustion chamber by means of a rotating magnetic field;
    3. introducing a gas at a high velocity into said combustion chamber for combustion and for rotating nonmagnetic components in the same direction as said rotation of said magnetic components;
    4. introducing oxygen and a fuel of water and powdered metal into said combustion chamber;
    5. extracting and filtering combustion gases from said combustion chamber;
    6. extracting combusted solid waste from said combustion chamber after a predetermined period of time; and
    7. introducing said extracted combusted waste into a second combustion chamber and repeating in said second chamber the steps of magnetic rotation, introduction of high-velocity gas, introduction of fuel and oxygen, extraction and filtering of combustion gases and extraction of combusted waste.

12. The method as defined in claim 11 wherein more than two combustion chambers are provided and the steps of introducing combusted waste, magnetic rotation, introduction of high-velocity gas, introduction of fuel and oxygen, extraction and filtering of combustion gases, and the extraction of combusted waste are carried out in each of said chambers except that in the case of the first of said plurality of chambers the waste introduced is not combusted.

* * * * *